(12) United States Patent
Wen

(10) Patent No.: US 8,280,379 B2
(45) Date of Patent: Oct. 2, 2012

(54) METHOD AND TERMINAL FOR DETERMINING SOFT HANDOVER DIVERSITY SET THRESHOLDS

(75) Inventor: Yongming Wen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 6 days.

(21) Appl. No.: 13/125,801

(22) PCT Filed: Dec. 29, 2008

(86) PCT No.: PCT/CN2008/073829
§ 371 (c)(1),
(2), (4) Date: Apr. 22, 2011

(87) PCT Pub. No.: WO2010/045771
PCT Pub. Date: Apr. 29, 2010

(65) Prior Publication Data
US 2011/0212726 A1    Sep. 1, 2011

(30) Foreign Application Priority Data
Oct. 22, 2008    (CN) .......................... 2008 1 0173414

(51) Int. Cl.
*H04W 36/00* (2009.01)
(52) U.S. Cl. ........................................ 455/436; 455/440
(58) Field of Classification Search ........... 455/436–442
See application file for complete search history.

(56) References Cited

U.S. PATENT DOCUMENTS

| 6,539,227 B1 | 3/2003 | Jetzek et al. |
| 6,754,493 B1 | 6/2004 | Jetzek |
| 7,433,310 B2 | 10/2008 | Marinier |
| 2004/0242161 A1 | 12/2004 | Marinier |
| 2009/0041002 A1 | 2/2009 | Marinier |
| 2009/0111473 A1 * | 4/2009 | Tao et al. ...................... 455/440 |

FOREIGN PATENT DOCUMENTS

| CN | 1352866 A | 6/2002 |
| CN | 1355624 A | 6/2002 |
| CN | 101023682 A | 8/2007 |
| WO | WO2008020473 | 2/2008 |

OTHER PUBLICATIONS

International Search Report, Application No. PCT/CN2008/073829, dated Jul. 30, 2009.

* cited by examiner

*Primary Examiner* — Lester Kincaid
*Assistant Examiner* — Joel Ajayi
(74) *Attorney, Agent, or Firm* — Knobbe Martens Olson & Bear LLP

(57) ABSTRACT

A method and a terminal for determining soft handover diversity thresholds are disclosed in the present invention. In the above method, at first, a terminal determines a dynamical addition threshold of a diversity corresponding to the terminal according to the first predetermined information, wherein the first predetermined information comprises: carrier-to-interference noise ratios CINRs of all the base stations in the diversity, and parameters carried in downlink channel description messages that are received from base stations by the terminal; then, the terminal determines a dynamical deletion threshold for each base station in the diversity according to the second predetermined information respectively, wherein, for each base station, the second predetermined information comprises: CINRs for base stations in the diversity whose CINRs are greater than the CINR of the base station, and parameters carried in downlink channel description messages. According to the technical solution disclosed in the present invention, a terminal can perform handover according to the current network condition, thereby the system stabilization can be ensured and the system efficiency can be improved.

10 Claims, 9 Drawing Sheets

METHOD AND TERMINAL FOR DETERMINING SOFT HANDOVER DIVERSITY SET THRESHOLDS

TECHNICAL FIELD

The present invention relates to the field of mobile communications, especially to a method and terminal for determining soft handover diversity set thresholds.

BACKGROUND OF THE INVENTION

The handover technology in a wireless communication network refers to, when a terminal moves, after accessing network via a certain base station, to the coverage area of another base station due to mobility of the terminal, a technology of process where the another base station is taken as a serving base station of a terminal to provide network access service to the terminal. In addition to a conventional hard handover, handover methods specified in IEEE 802.16e standard also comprise two soft handover methods, i.e. Macro Diversity Handover (MDHO) and Fast Base Station Switching (FBSS). In the two soft handover methods, a plurality of base stations need to be combined as a diversity set (DS) of a terminal. The terminal establishes connections with all the base stations in the diversity set, and adds a certain base station into the diversity set or deletes a certain base station from the diversity set according to signal strength changes of the base station during handover.

It is specified in the current IEEE 802.16e standard that a base station supporting MDHO or FBSS needs to send two thresholds H_Add (addition threshold) and H_Delete (deletion threshold) via broadcasting. When detecting the Carrier-to-Interference-and-Noise Ratio (CINR) of a certain base station is more than H_Add, the terminal will add the base station into its diversity set; when detecting the CINR of a certain base station in the diversity set is less than H_Delete, the terminal will delete the base station from its diversity set.

The above method for setting handover diversity set thresholds is a static thresholds method. However, the actual network condition is that the strengths of network signals differ in different time points or places; i.e. sometimes the network coverage is comparatively good and the CINRs of all adjacent base stations are comparatively high; while sometimes the network coverage is comparatively bad and the CINRs of all adjacent base stations are comparatively low. When the static thresholds method is applied, in a condition of either good or bad network coverage, the value of H_Add or H_Delete should neither be too high nor too low. If the value of H_Add or H_Delete is too high, in a condition of the bad network coverage, it may occur that none of the CINRs of adjacent base stations can reach H_Add, and thus those base stations can not be added into the diversity set; moreover, the base stations in the diversity set are more likely to be deleted since their CINRs are less than H_Delete which leads to a handover loss. If the value of H_Add or H_Delete is too low, in a condition of the good network coverage, it may occur that the CINRs of most adjacent base stations exceed H_Add; moreover, all the base stations in the diversity set are remained since the CINRs of these base stations are all more than H_Delete, resulting in excess of base stations added into the diversity set and waste of network resources.

As stated above, the current methods for setting handover diversity set thresholds are not flexible enough during implementation. Handover thresholds can not be optimized flexibly according to the actual condition of the network, and thus can not be dynamically adapted to the actual conditions of the network.

SUMMARY OF THE INVENTION

To solve the problems in the prior art that handover diversity set thresholds are short of flexibility and handover thresholds can not be optimized flexibly according to the actual network conditions, the present invention provides an improved solution for determining soft handover diversity set thresholds to settle at least one of the above problems.

To achieve the above object, according to one aspect of the present invention, there is provided a method for determining soft handover diversity set thresholds.

The method for determining soft handover diversity set thresholds according to the present invention comprises: firstly, a terminal determining a dynamical addition threshold of a diversity set corresponding to the terminal according to first predetermined information, wherein the first predetermined information comprises Carrier-to-Interference-and-Noise Ratios (CINRs) of all base stations in the diversity set and parameters carried in a downlink channel descriptor message received by the terminal from base stations; the terminal respectively determining a dynamical deletion threshold of each base station in the diversity set according to second predetermined information, wherein in respect of each base station, the second predetermined information comprises CINRs of base stations in the diversity set with CINRs more than the CINR of the base station and parameters carried in the downlink channel descriptor message.

Preferably, the terminal determines the dynamical addition threshold H_Add_d of the diversity set according to the first predetermined information via the following formula:

$$H\_Add\_d = Slope \times \sum_{i=1}^{n} CINR_i + Add\_Intercept,$$

wherein Slope is a preset weighted parameter more than zero, Add_Intercept is a preset static addition threshold determined according to the parameters carried in the downlink channel descriptor message, and $$\sum_{i=1}^{n} CINR_i$$

is a sum of the CINRs of all base stations in the diversity set; the terminal respectively determines a dynamical deletion threshold H_Delete_d of each base station in the diversity set according to the second predetermined information via the following formula:

$$H\_Delete\_d = Slope \times \sum_{i=1}^{m} CINR_i + Delete\_Intercept,$$

wherein Slope is a preset weighted parameter more than zero, Delete_Intercept is a preset static deletion threshold determined according to parameters carried in the downlink channel descriptor message, and $$\sum_{i=1}^{m} CINR_i$$

is a sum of the CINRs of base stations in the diversity set with CINRs more than the CINR of the base station.

Preferably, the parameters carried in the downlink channel descriptor message comprise the weighted parameter, the static addition threshold and an adjusted value of the static deletion threshold; wherein the static deletion threshold is a difference between the static addition threshold and the adjusted value of the static deletion threshold.

Preferably, the parameters carried in the downlink channel descriptor message comprise the weighted parameter, the static deletion threshold and an adjusted value of the static addition threshold; wherein the static addition threshold is a sum of the static deletion threshold and the adjusted value of the static addition threshold.

Preferably, the parameters carried in the downlink channel descriptor message comprise the weighted parameter, the static deletion threshold, the static addition threshold and a margin parameter; when the dynamical deletion threshold of one of the base stations in the diversity set is more than the difference between the dynamical addition threshold of the diversity set and the margin parameter, the dynamical deletion threshold is set to be the difference between the dynamical addition threshold and the margin parameter.

According to another aspect of the present invention, there is provided a terminal.

The terminal according to the present invention comprises a receiving module, a measuring module, a first determining module and a second determining module, wherein the receiving module is configured to receive a downlink channel descriptor message from a base station; the measuring module is configured to measure a CINR of each base station in a diversity set corresponding to the terminal; the first determining module is configured to determine a dynamical addition threshold of the diversity set according to parameters carried in the downlink channel descriptor message received by the receiving module and CINRs of all base stations in the diversity set measured by the measuring module; the second determining module is configured to respectively determine a dynamical deletion threshold of each base station in the diversity set, wherein the dynamical deletion threshold of each base station is determined according to CINRs of base stations in the diversity set with CINRs more than the CINR of the base station and parameters carried in the downlink channel descriptor message.

Preferably, the first determining module comprises: a first acquiring sub-module, configured to acquire a preset weighted parameter and a static addition threshold from the downlink channel descriptor message; a first determining sub-module, configured to determine the dynamical addition threshold H_Add_d of the diversity set according to the weighted parameter and static addition threshold acquired by the first acquiring sub-module and the CINR of each base station in the diversity set measured by the measuring module via the following formula:

$$H\_Add\_d = Slope \times \sum_{i=1}^{n} CINR_i + Add\_Intercept,$$

wherein Slope is the weighted parameter, Add_Intercept is the static addition threshold, and $$\sum_{i=1}^{n} CINR_i$$

is a sum of the CINRs of all base stations in the diversity set.

Preferably, the first acquiring sub-module further comprises: a reading unit, configured to read the weighted parameter, the static deletion threshold and an adjusted value of the static addition threshold from parameters carried in the downlink channel descriptor message; a determining unit, configured to set the sum of the static deletion threshold and the adjusted value of the static addition threshold read by the reading unit as the static addition threshold.

Preferably, the second determining module comprises: a second acquiring sub-module, configured to acquire a preset weighted parameter and a static deletion threshold of the diversity set from the downlink channel descriptor message; a second determining sub-module, configured to respectively determine the dynamical deletion threshold H_Delete_d of each base station of the diversity set according to the weighted parameter and static deletion threshold acquired by the second acquiring sub-module and the CINR of each base station of the diversity set measured by the measuring module via the following formula:

$$H\_Delete\_d = Slope \times \sum_{i=1}^{m} CINR_i + Delete\_Intercept,$$

wherein Slope is the weighted parameter, Delete_Intercept is the static deletion threshold, and $$\sum_{i=1}^{m} CINR_i$$

is the sum of CINRs of base stations in the diversity set with CINRs more than the CINR of the base station.

Preferably, the second acquiring sub-module comprises: a reading unit, configured to read the weighted parameter, the static addition threshold and an adjusted value of the static deletion threshold from parameters carried in the downlink channel descriptor message; a determining unit, configured to set the difference between the static addition threshold and the adjusted value of the static deletion threshold read by the reading unit as the static deletion threshold.

Preferably, the second determining module also comprises: a third acquiring sub-module, configured to acquire a preset margin parameter from the downlink channel descriptor message; a judging sub-module, configured to judge whether the dynamical deletion threshold of each base station is more than the difference between the dynamical addition threshold and the margin parameter; a setting sub-module, configured to set the difference between the dynamical addition threshold and the margin parameter as the dynamical deletion threshold of the base station in the condition that the judgment result of the judging sub-module is yes.

By means of at least one of the above technical solutions, a terminal dynamically sets the dynamical addition threshold of the diversity set and the dynamical deletion threshold of each base station in the diversity set according to the currently measured CINR of each base station of the diversity set corresponding to the terminal. The problems that handover diversity set thresholds are short of flexibility and handover thresholds can not be optimized flexibly according to the actual network conditions are therefore solved so that the terminal can perform handover according to the current network condition to ensure the stability of the system and increase the efficiency of the system.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings illustrated here provide a further understanding of the present invention and constitute a part of the specification. The schematic embodiments and explanations thereof serve to explain the present invention and are not intended to restrict it. In the drawings.

Figure 3A:
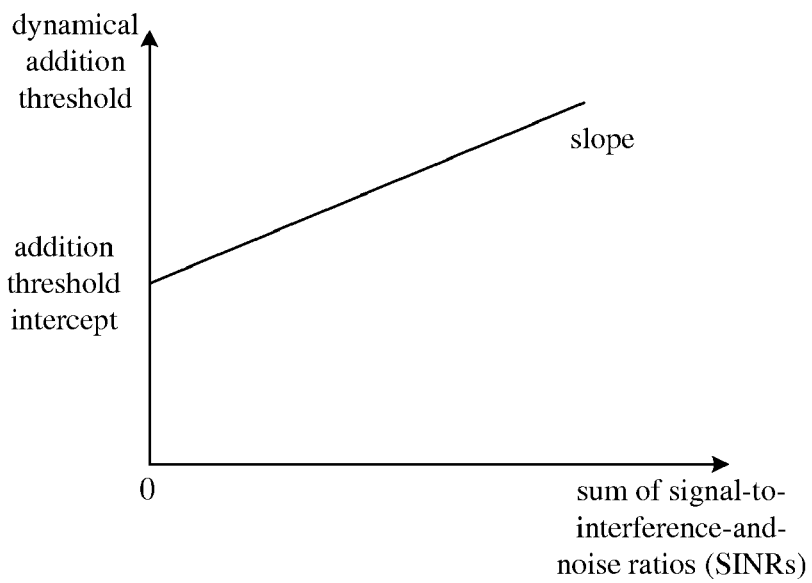
FIG. 3A is a schematic diagram showing the relationship between H_Add_d and $$\sum_{i=1}^{n} CINR_i$$
Figure 3B:
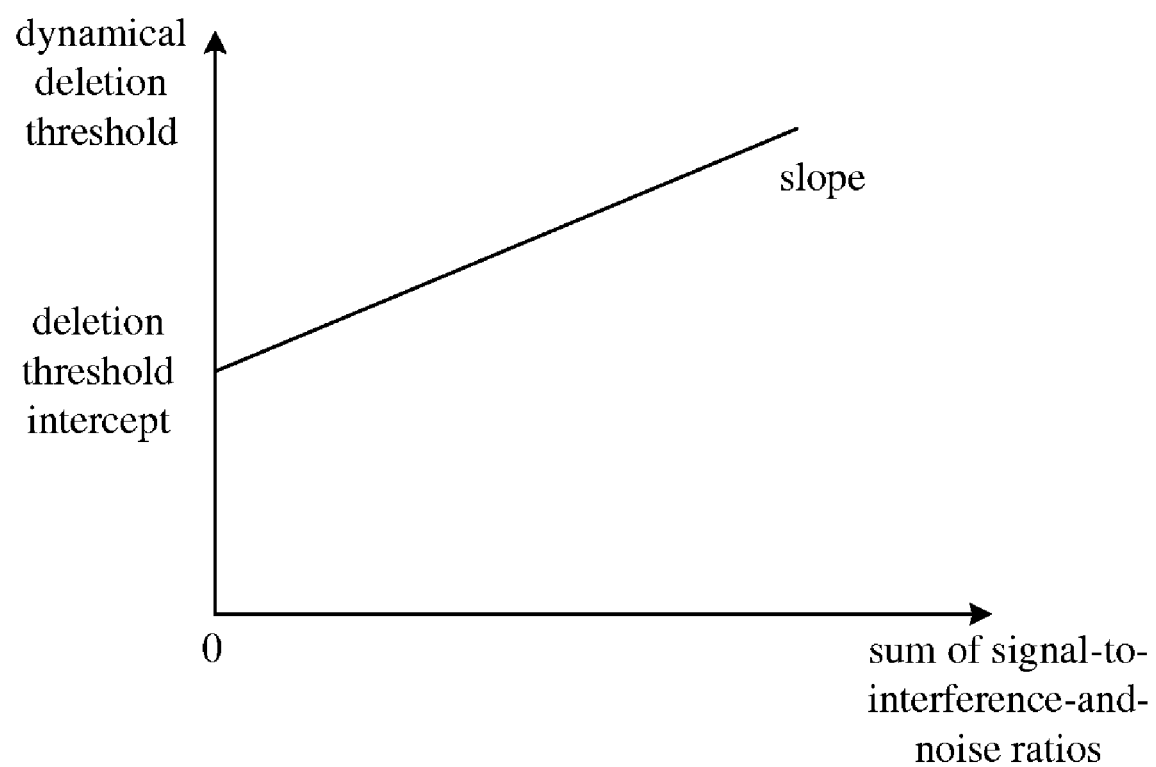
Figure 4A:
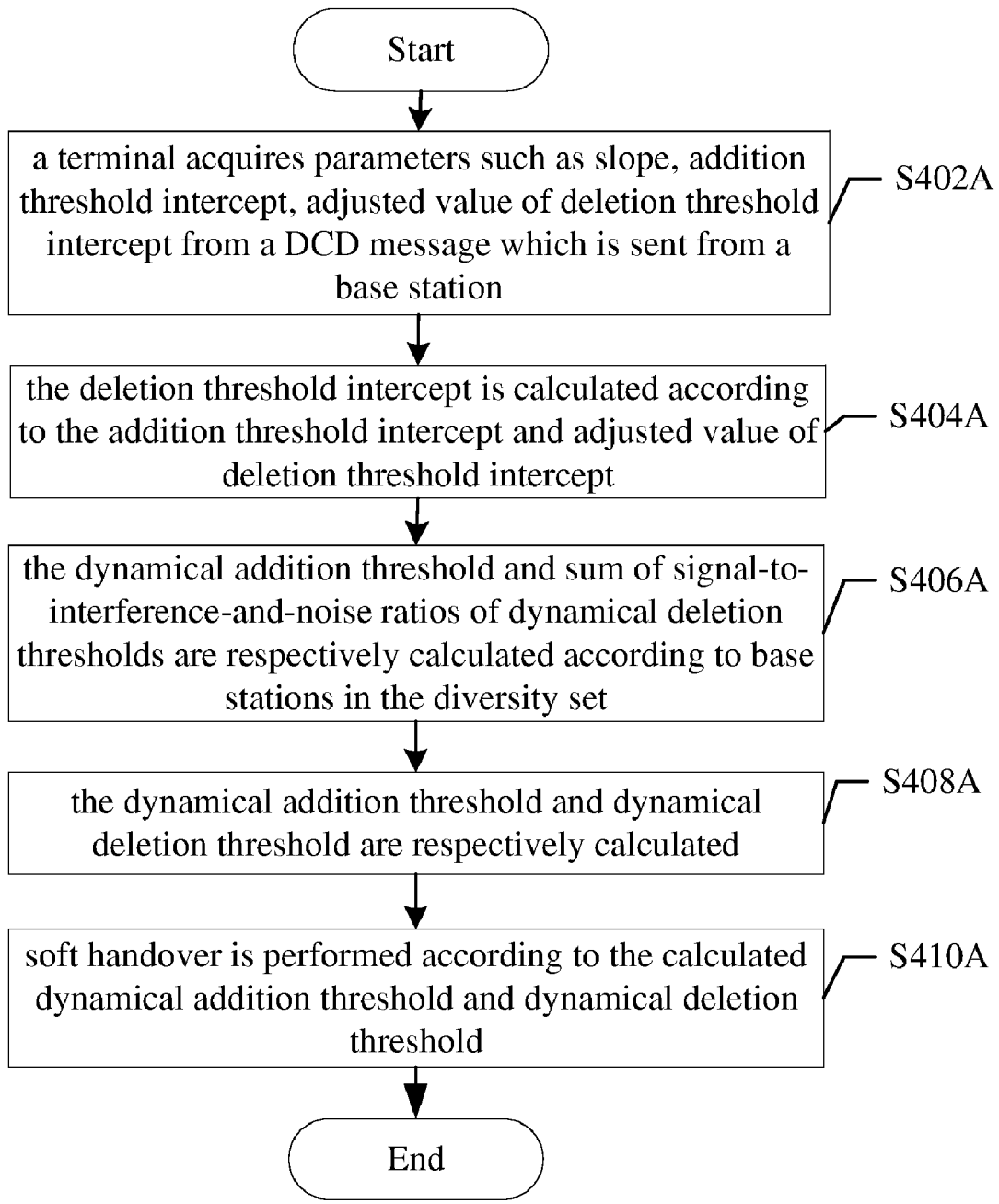
Figure 4B:
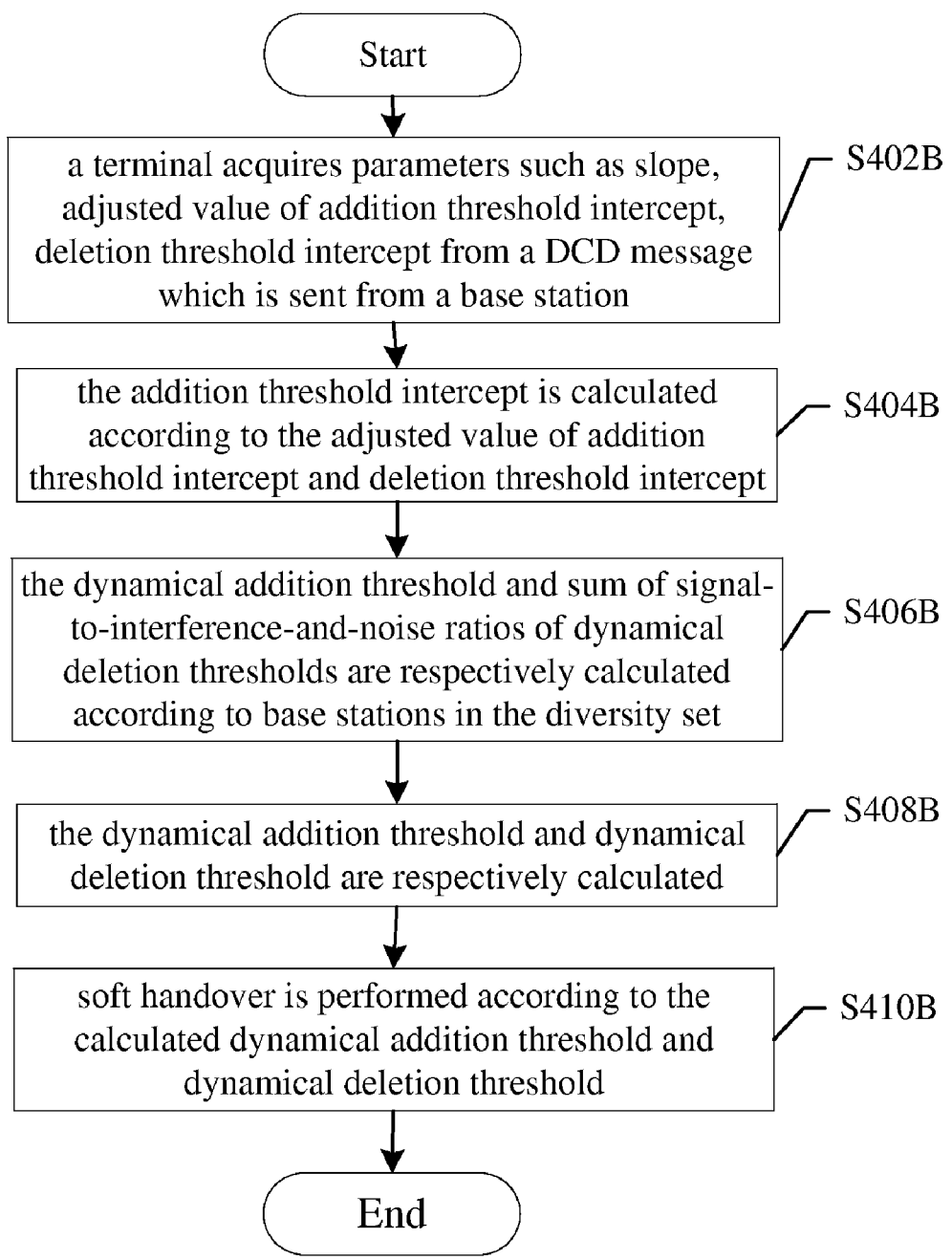
Figure 5:
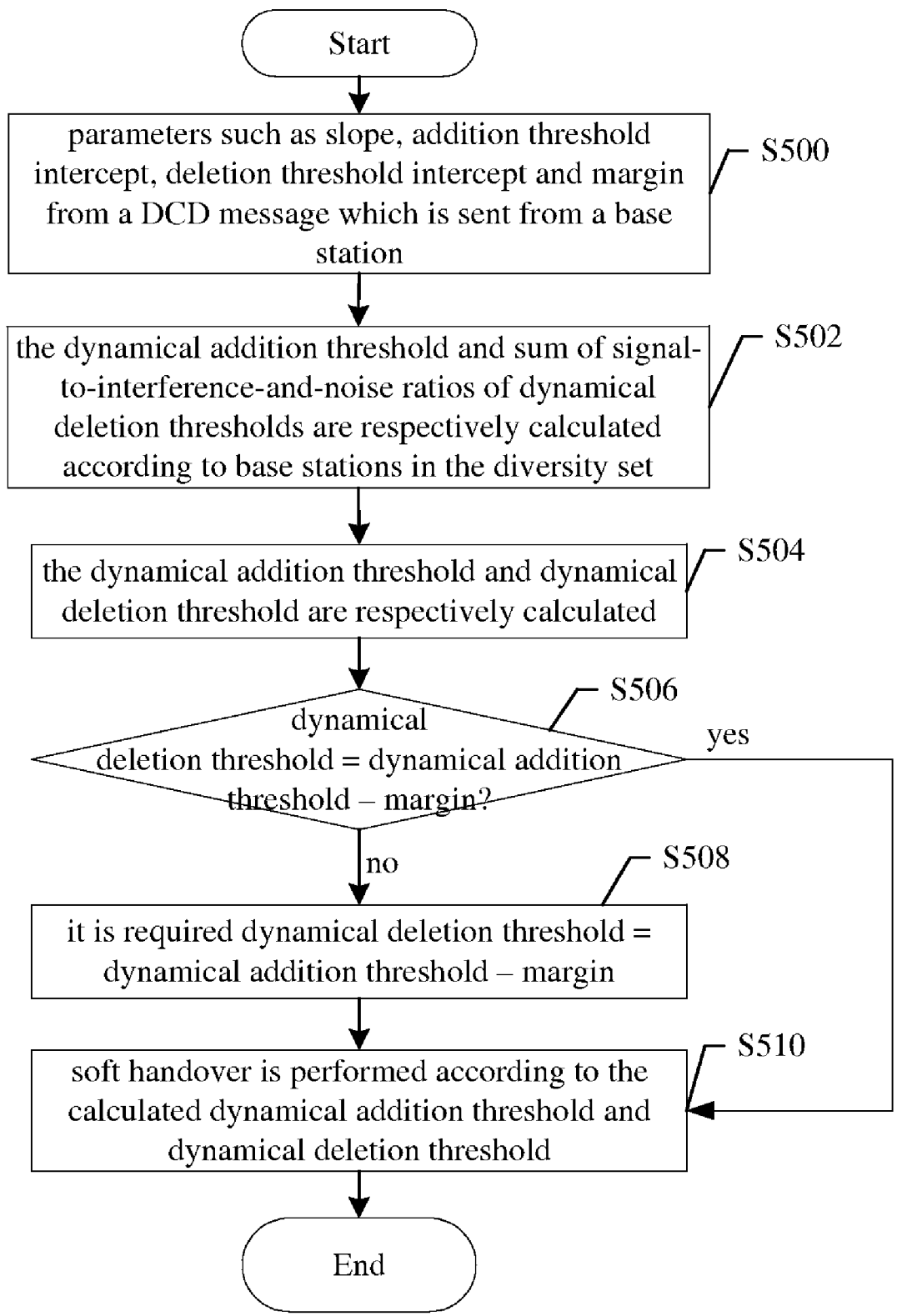
Figure 6:
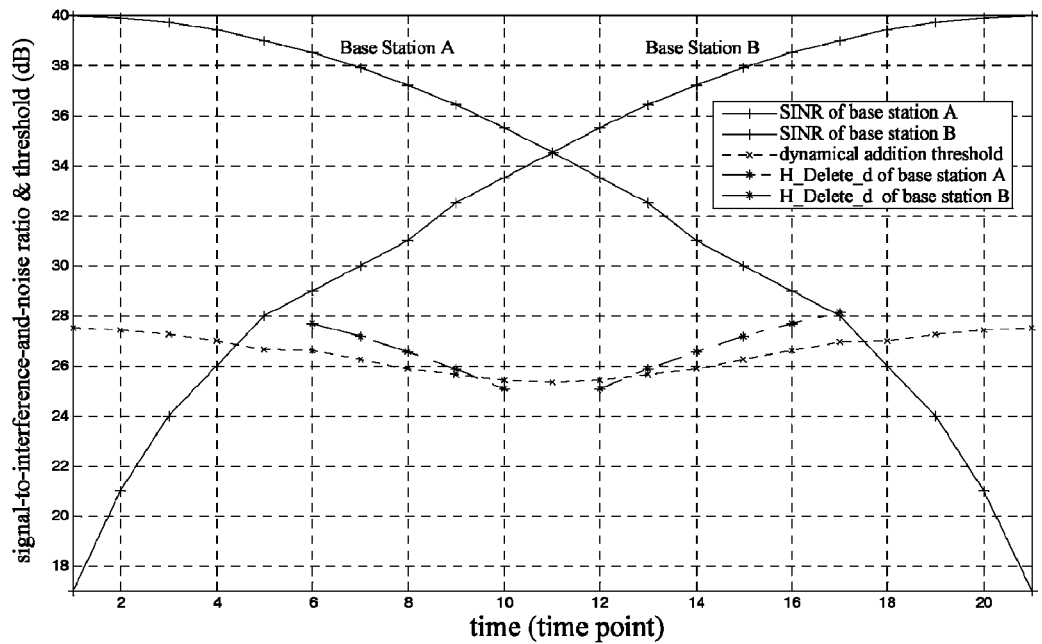
Figure 7:
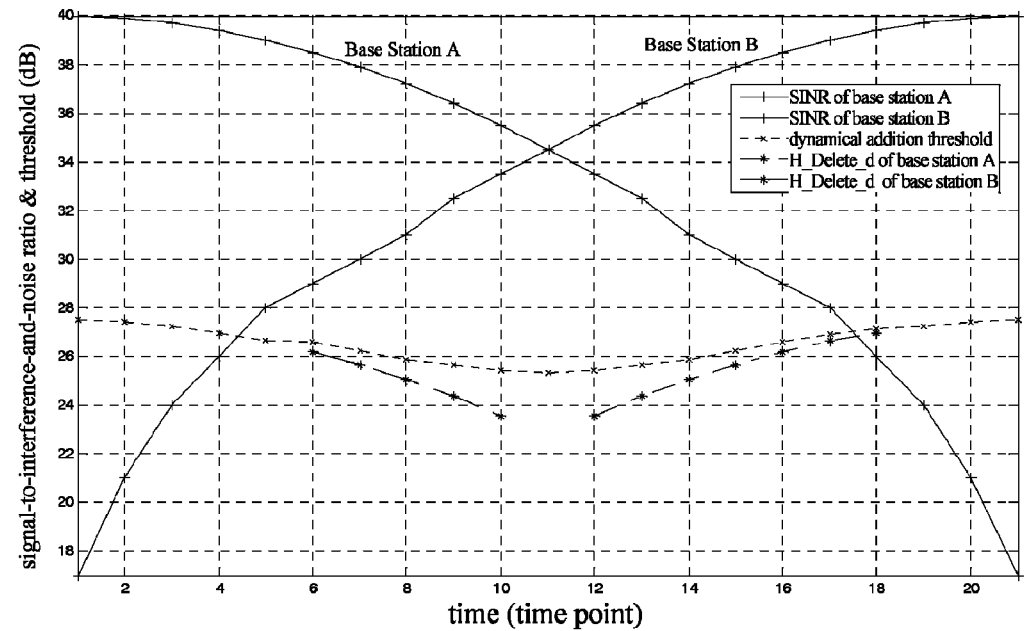
Figure 8:
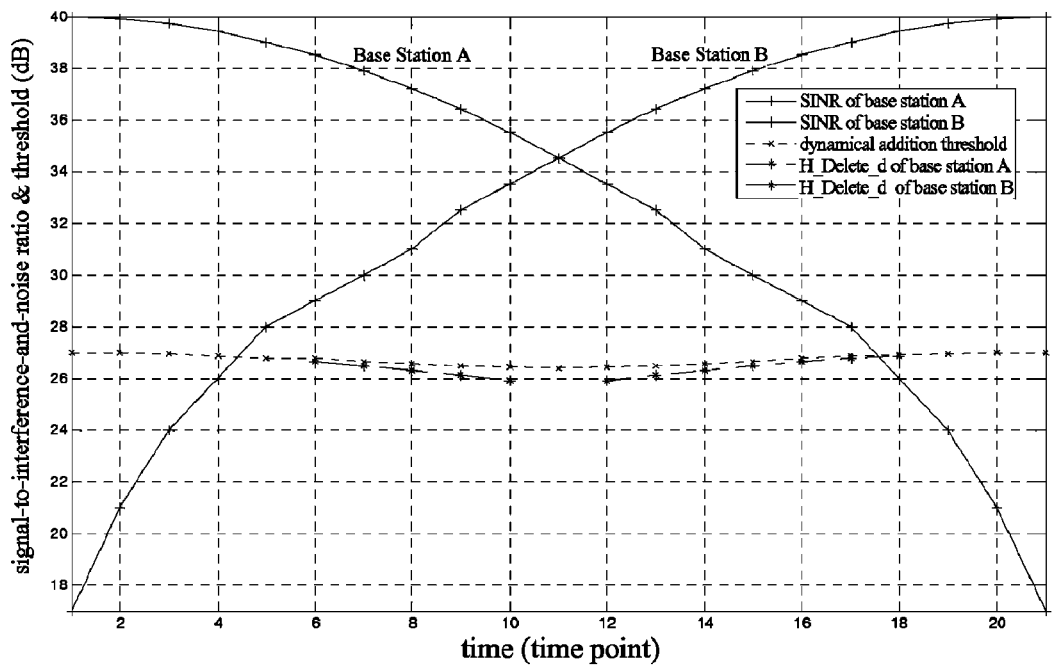
Figure 9:
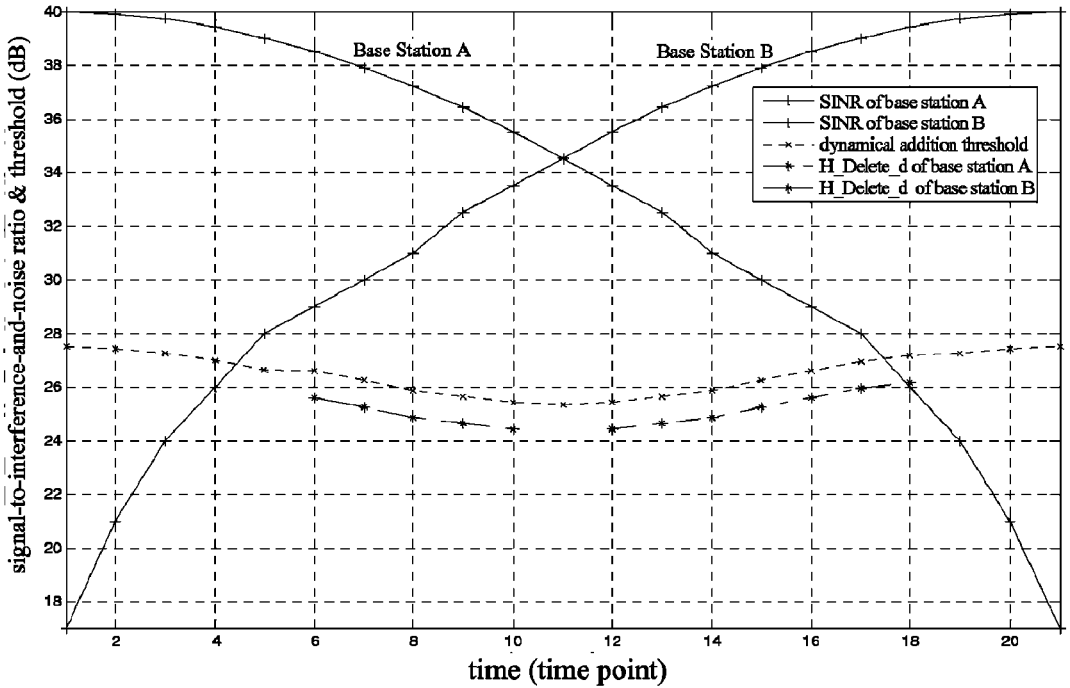

in an embodiment of the present invention;

FIG. 3B is a schematic diagram showing the relationship between H_Delete_d and $$\sum_{i=1}^{m} CINR_i$$

in an embodiment of the present invention;

FIG. 4A is a flow chart showing the method for determining soft handover diversity set thresholds in which Method 1 in an embodiment of the present invention is adopted to prevent threshold inversion;

FIG. 4B is a flow chart showing the method for determining soft handover diversity set thresholds in which Method 2 in an embodiment of the present invention is adopted to prevent threshold inversion;

FIG. 5 is a flow chart showing the method for determining soft handover diversity set thresholds in which Method 3 in an embodiment of the present invention is adopted to prevent threshold inversion;

FIG. 6 is a curve chart of the soft handover dynamical thresholds in the embodiment 1;

FIG. 7 is a curve chart of the soft handover dynamical thresholds in the embodiment 2;

FIG. 8 is a curve chart of the soft handover dynamical thresholds in the embodiment 3;

FIG. 9 is a curve chart of the soft handover dynamical thresholds in the embodiment 4.

DETAILED DESCRIPTION OF THE EMBODIMENTS

Function Overview

The general concept of the embodiments of the present invention is: in a condition of good network coverage, the CINRs of all adjacent base stations are comparatively high, and signals of handover target base stations selectable for the terminal are comparatively good. To preferably select a base station with the best signal from these target base stations, the terminal can properly raise H_Add and H_Delete according to conditions of the CINRs of the existing base stations in the diversity set, so that when a new base station is added into the diversity set, the CINR of that base station needs to reach the higher H_Add threshold, and base stations in the diversity set will be deleted immediately when their CINRs are less than the higher H_Delete threshold. In contrast, in a condition of bad network coverage, the CINRs of all adjacent base stations are comparatively low, and signals of handover target base stations selectable for the terminal are comparatively bad. To select a handover target base station with a relatively good signal from these target base stations, the terminal can properly lower H_Add and H_Delete according to conditions of the CINRs of the existing base stations in the diversity set. When a new base station is added, the CINR of the new base station only needs to reach the lower H_Add threshold, and existing base stations in the diversity set will not be deleted unless their CINRs are less than the lower H_Delete threshold.

According to the above concept, an embodiment of the present invention provides a solution of determining soft handover diversity set thresholds, which can serve to determine soft handover diversity set thresholds in the IEEE802.16e standard. In this solution, a terminal dynamically determines the dynamical addition threshold of the diversity set and the dynamical deletion threshold of each base station in the diversity set according to the CINRs of the base stations in the current diversity set, so that adaptive and dynamical regulation of thresholds according to real network conditions can be achieved and the dynamical addition threshold and dynamical deletion thresholds can be increased with the increase of the CINRs of the base stations, and decreased with the reduction of the CINRs.

The preferable embodiments of the present invention will be illustrated in combination with the accompanying drawings in details as follows, and if there is no conflict, the embodiments and the technical features of the embodiments can be combined with each other. It should be understood that the preferable embodiments described here only serve to explain the present invention and are not intended to restrict the same.

According to an embodiment of the present invention, there is provided a terminal.

Figure 1A:
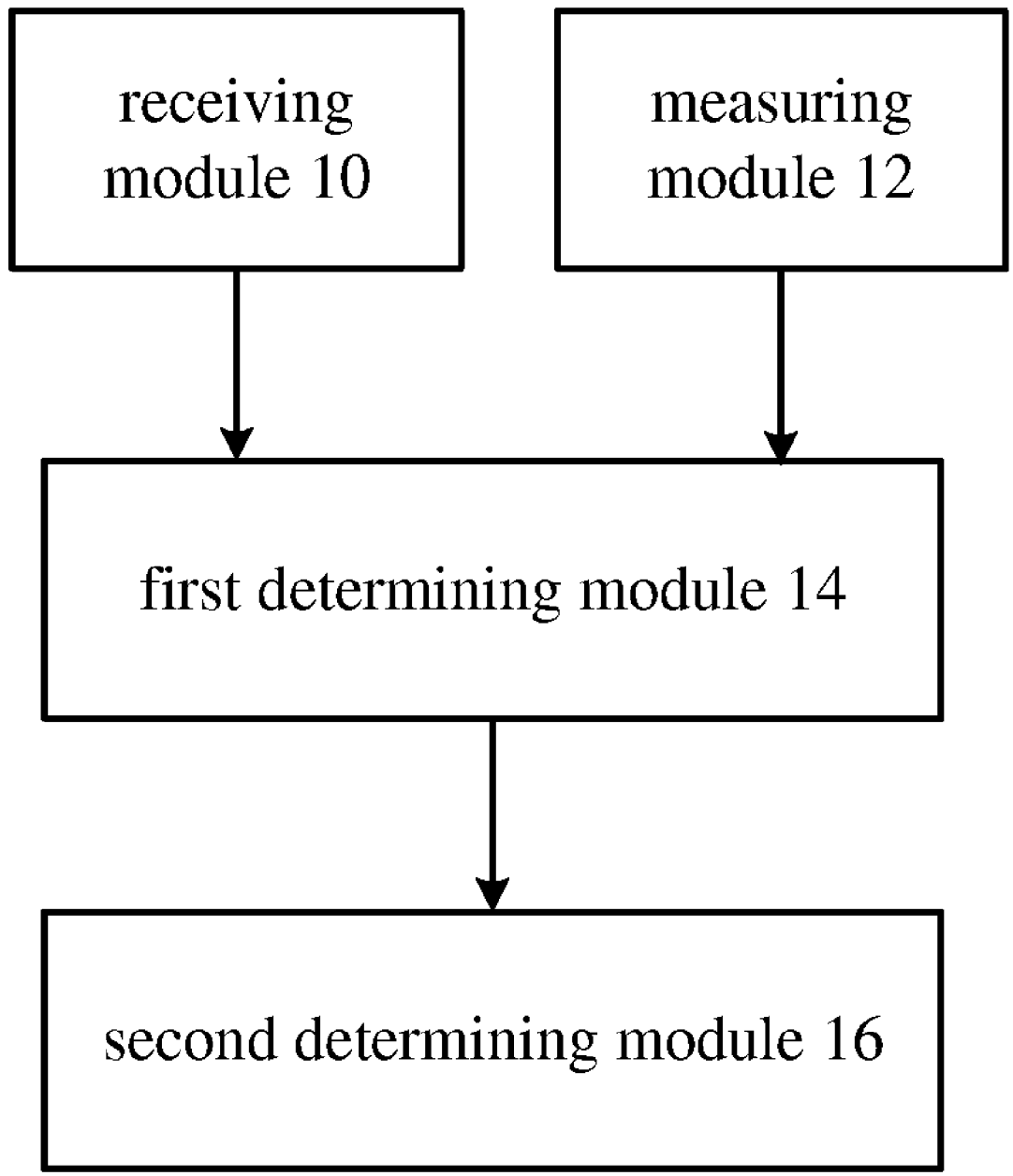
FIG. 1A is a block diagram showing the structure of the terminal according to an embodiment of the present invention.
Figure 1B:
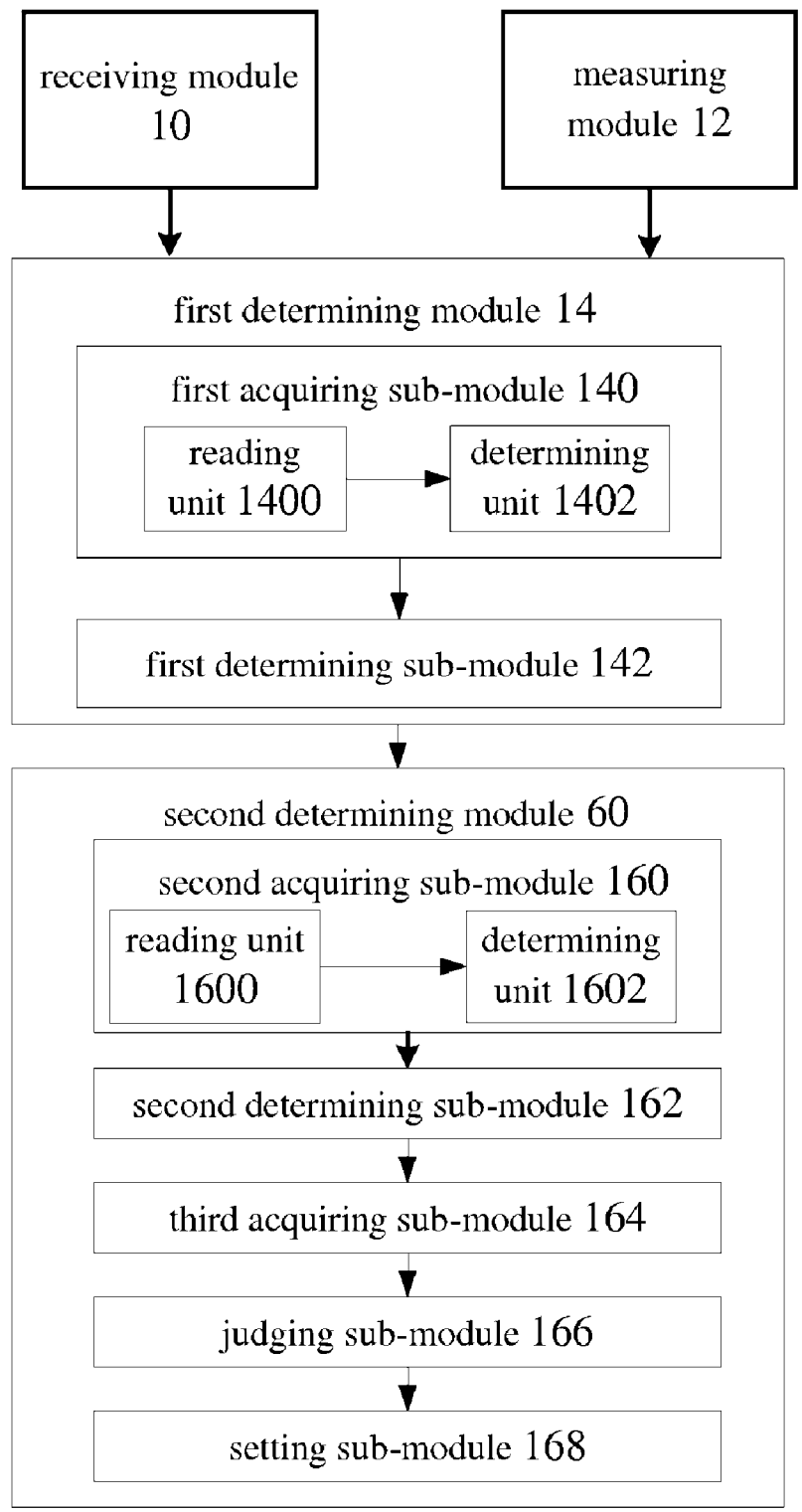
FIG. 1B is a block diagram showing the structure of the terminal according to a preferable embodiment of the present invention.

FIG. 1A is a block diagram showing the structure of the terminal according to an embodiment of the present invention, and FIG. 1B is a block diagram showing the structure of the terminal according to a preferable embodiment of the present invention.

As shown in FIG. 1A, the terminal according to the embodiment of the present invention comprises a receiving module 10, a measuring module 12, a first determining module 14 and a second determining module 16. Each module above will be described in details as follows in combination with the accompanying drawings.

(I) the receiving module 10 is configured to receive a downlink channel descriptor (DCD) message from a base station.

In the above, parameters carried in the downlink channel descriptor message can comprise the following three situations:

(1) preset weighted parameter (Slope), static addition threshold (Add_Intercept) and adjusted value of static deletion threshold;

(2) Slope, static deletion threshold (Delete_Intercept), and adjusted value of static addition threshold (Add_Intercept_Adjust);

(3) Slope, Add_Intercept, Delete_Intercept and margin parameter (Margin).

In practice, operators can set the parameter values carried in the DCD message according to information of practical network conditions.

(II) the measuring module 12 is configured to measure a CINR of each base station in a diversity set corresponding to the terminal;

(III) the first determining module 14, connected with the receiving module 10 and measuring module 12, is configured to determine a dynamical addition threshold of the diversity set according to parameters carried in the downlink channel descriptor message received by the receiving module 10 and the CINRs of all base stations in the diversity set measured by the measuring module 12.

More specifically, as shown in FIG. 1B, the first determining module 14 can comprise a first acquiring sub-module 140 and a first determining sub-module 142, wherein the first acquiring sub-module 140 is configured to acquire a preset weighted parameter Slope and a static addition threshold Add_Intercept of the diversity set from the above downlink channel descriptor message; and the first determining sub-module 142, connected with the first acquiring sub-module 140, is configured to determine the dynamical addition threshold H_Add_d of the diversity set according to Slope and Add_Intercept acquired by the first acquiring sub-module 140 and the CINR of each base station in the above diversity set measured by the measuring module 12 via the following formula:

$$H\_Add\_d = Slope \times \sum_{i=1}^{n} CINR_i + Add\_Intercept,$$

wherein $$\sum_{i=1}^{n} CINR_i$$

is the sum of the CINRs of all base stations in the diversity set.

More specifically, if the parameters carried in the above DCD message belong to the above situation (2), then as shown in FIG. 1A, the first acquiring sub-module 140 can comprise a reading unit 1400 and a determining unit 1402, wherein the reading unit 1400 is configured to read the preset weighted parameter, the static deletion threshold and the adjusted value of the static addition threshold from parameters carried in the DCD message; and the determining unit 1402, connected with the reading unit 1400, is configured to set the sum of the static deletion threshold and the adjusted value of the static addition threshold read by the reading unit 1400 as the static addition threshold.

(IV) the second determining module 16 is configured to respectively determine a dynamical deletion threshold of each base station in the above diversity set, wherein the dynamical deletion threshold of each base station is determined according to CINRs of base stations in the diversity set with CINRs more than the CINR of the base station and parameters carried in the DCD message.

More specifically, as shown in FIG. 1B, the second determining module 16 can comprise a second acquiring sub-module 160 and a second determining sub-module 162, wherein the second acquiring sub-module 160 is configured to acquire the preset weighted parameter Slope and the static deletion threshold Delete_Intercept of the diversity set from the DCD message; and a second determining sub-module 162, connected with the second acquiring sub-module 160, is configured to respectively determine the dynamical deletion threshold H_Delete_d of each base station of the above diversity set according to Slope and Delete_Intercept acquired by the second acquiring sub-module 160 and the CINR of each base station of the above diversity set measured by the measuring module 12 via the following formula:

$$H\_Delete\_d = Slope \times \sum_{i=1}^{m} CINR_i + Delete\_Intercept,$$

wherein m is the number of base stations in the diversity set with CINRs more than that of the base station, and $$\sum_{i=1}^{m} CINR_i$$

is the sum of the CINRs of the above base stations.

More specifically, if parameters carried in the DCD message received by the receiving module 10 is the above situation (1), as shown in FIG. 1B, the second acquiring sub-module 160 can comprise a reading unit 1600 and a determining unit 1602, wherein the reading unit 1600 is configured to read the weighted parameter, the static addition threshold and the adjusted value of the static deletion threshold from parameters carried in the DCD message; and the determining unit 1602, connected with the reading unit 1600, is configured to set the difference between the static addition threshold and the adjusted value of the static deletion threshold read by the reading unit 1600 as the static deletion threshold.

In addition, if parameters carried in the DCD message received by the receiving module 10 is the above situation (3), as shown in FIG. 1B, the second determining module 16 can further comprise a third acquiring sub-module 164, a judging sub-module 166 and a setting sub-module 168, wherein the third acquiring sub-module 164 is configured to acquire a preset margin parameter from the DCD message; the judging sub-module 166, connected with the third acquiring sub-module 164, is configured to judge whether the dynamical deletion threshold of each base station is more than the difference between the dynamical addition threshold of the above diversity set and the margin parameter; and the setting sub-module 168, connected with the judging sub-module 166, is configured to set the difference between the above dynamical addition threshold and the margin parameter as the dynamical deletion threshold of the base station in the condition that the judgment result of the judging sub-module 166 is yes.

With the terminal provided by the embodiments of the present invention, the dynamical addition threshold of the diversity set and the dynamical deletion threshold of each base station in the diversity set can be dynamically adjusted according to the CINRs of the base stations in the current diversity set.

According to an embodiment of the present invention, there is also provided a method for determining soft handover diversity set thresholds.

Figure 2:
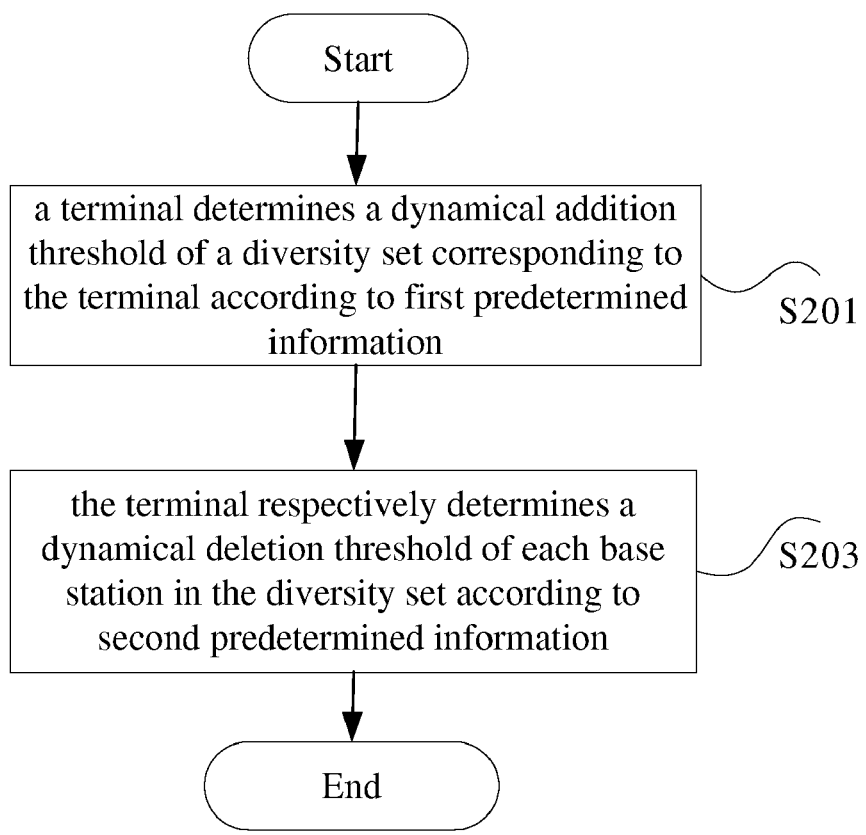
FIG. 2 is a flow chart showing the method for determining soft handover diversity set thresholds according to an embodiment of the present invention.

FIG. 2 is a flow chart showing the method for determining soft handover diversity set thresholds according to an embodiment of the present invention. As shown in FIG. 2, the method for determining soft handover diversity set thresholds according to the embodiment of the present invention comprises the following processes (Step S201 to Step S203).

Step S201, a terminal determines a dynamical addition threshold of a diversity set corresponding to the terminal according to first predetermined information, wherein the first predetermined information includes CINRs of all base stations in the diversity set and parameters carried in a DCD message received by the terminal from base stations;

Step S203, the terminal respectively determines a dynamical deletion threshold of each base station in the diversity set according to second predetermined information, wherein in respect of each base station, the second predetermined information includes CINRs of base stations in the diversity set with CINRs more than the CINR of the base station and parameters carried in the DCD message.

The processes above will be described in details as follows.

(I) Step S201

As it is specified in the 802.16e standard that a base station transmits static thresholds to all terminals via broadcasting by carrying H_Add and H_Delete in a broadcasted DCD message, thus in the embodiments of the present invention a DCD message is used to carry the parameters for determining the dynamical addition threshold and dynamical deletion threshold.

Before Step S201 is performed, the terminal firstly calculates the CINR of each base station in its diversity set according to information such as current carriers and receives from the base station a DCD message, wherein parameters for determining the dynamical addition threshold and dynamical deletion threshold of the diversity set are carried in the DCD message.

More specifically, the terminal can determine the dynamical addition threshold H_Add_d of its corresponding diversity set according to formula (1):

$$H\_Add\_d = Slope \times \sum_{i=1}^{n} CINR_i + Add\_Intercept \quad (1)$$

In the above, Slope is a preset weighted parameter, Add_Intercept is a preset static addition threshold that can be determined according to the parameters carried in the DCD message. In practice, operators can, set Slope and Add_Intercept according to needs and send them to the terminal via the base station.

$$\sum_{i=1}^{n} CINR_i$$

is the sum of the CINRs of all base stations in the diversity set, wherein n is the number of the base stations in the diversity set.

Moreover, to ensure that the dynamical addition threshold can be increased with the increase of the CINRs of the base stations in the diversity set, the Slope above should always be set to be a positive number.

FIG. 3A is a schematic diagram showing a relationship between H_Add_d and $$\sum_{i=1}^{n} CINR_i.$$

As shown in FIG. 3A, From the above formula (1), if the result of the sum of the base stations in the diversity set is taken as an independent variable and the dynamical addition threshold as a dependent variable, the dynamical addition threshold is a linear function of the sum of the CINRs of the base stations in the diversity set and the algorithm of the dynamical addition threshold can therefore be obtained, that is, firstly the sum of the CINRs of all base stations in the diversity set is calculated, and afterwards the sum of the CINRs is multiplied by Slope and then added with Add_Intercept.

(II) Step S203

In respect of each base station in the diversity set, the terminal can determine the dynamical deletion threshold H_Delete_d of the each base station via formula (2):

$$H\_Delete\_d = Slope \times \sum_{i=1}^{m} CINR_i + Delete\_Intercept \quad (2)$$

In the above, Slope is a preset weighted parameter, Delete_Intercept is a preset static deletion threshold, and $$\sum_{i=1}^{m} CINR_i$$

is the sum of the CINRs of the base stations in the diversity set with CINRs more than the CINR of the base station.

FIG. 3B is a schematic diagram showing the relationship between H_Delete_d and $$\sum_{i=1}^{m} CINR_i.$$

In combination with FIG. 3, it can be seen from the above formula (2) that in respect of a certain base station in the diversity set, its dynamical deletion threshold is a linear function of the sum of the CINRs of base stations with CINRs more than the CINR of this base station in the diversity set. The dynamical deletion threshold of each base station in the diversity set differs, for example, for a base station A in the diversity set, the algorithm is: firstly, the base stations with CINRs more than that of base station A are identified, afterwards the sum of the CINRs of these base stations is obtained, and then it is multiplied by Slope and added with Delete_Intercept.

In respect of the dynamical addition threshold and dynamical deletion threshold determined by the above method for determining soft handover diversity set thresholds provided by the embodiments of the present invention, when a certain base station is added into the diversity set, they will be determined according to signal strengths of all existing base stations in the diversity set, that is, if the signal strength of the network during handover is comparatively good, the sum of strengths of the CINRs of all base stations in the diversity set is comparatively high, thus the final H_Add_d threshold is also comparatively high, and the criterion of adding a new base station into the diversity set is comparatively strict, otherwise, the criterion of adding a new base station into the diversity set is comparatively undemanding. When a certain base station is to be deleted from the diversity set, it is determined according to the signal strengths of base stations with CINRs more than that of that base station, that is, for a certain base station A in the diversity set, when the CINRs of the other base stations in the diversity set are comparatively high or when there are a comparatively large amount of base stations with CINRs more than that of this base station, H_Delete_d is comparatively high, in this case, base station A is more likely to be deleted from the diversity set, otherwise, it is not likely to be deleted.

From the point of view of control theories, the above formulas (1) and (2) can be equivalent to a Proportional Integral (PI) controller, wherein intercept is proportional factor Kp, Slope×ΣCINR$_i$ integral part, and Slope is integral factor Ki.

It can be concluded from the above analysis that addition and deletion thresholds can be flexibly adjusted according to actual strengths of the CINRs of the base stations in the diversity set by the method for determining soft handover diversity set thresholds in the embodiments of the present invention and the adjusted result is consistent with the expectation for optimizing network parameters.

In practice, operators can control the dynamical addition threshold of the diversity set and the dynamical deletion threshold of the each base station by configuring adjusting parameters H_Add, H_Delete and Slope, wherein H_Add and H_Delete are respectively the static addition and deletion thresholds and also reference values of the dynamical addition and deletion thresholds; Slope is a slope and also a weighted value of the influence which exerted by the sum of the CINR strengths of base stations in the diversity set on the final thresholds. If the value of Slope is comparatively high, the CINR strengths of base stations in the diversity set exert more influence on the dynamical thresholds, otherwise, less influence is exerted. If the value of Slope is zero, no influence will be exerted. With these three parameters, the operators can flexibly and easily configure handover dynamical thresholds.

In practical applications, the value of a deletion threshold should be less than that of an addition threshold, otherwise, threshold inversion will occur, that is, the value of the deletion threshold is more than that of the addition threshold. In the condition that the value of the deletion threshold is more than that of the addition threshold, it is supposed that signals of adjacent base stations are probably not very good (CINR is less than H_Delete_d but more than H_Add_d), a base station will be added into the diversity set when its CINR only needs to exceed a comparatively low threshold (addition threshold); and a base station will be deleted from the diversity set once its CINR is less than a comparatively high threshold (deletion threshold). This may result in the following two problems:

(1) adjacent base stations with comparatively low CINRs are added into the diversity set, while those with comparatively high CINRs are deleted from the diversity set;
(2) base stations with CINRs more than the addition threshold but less than the deletion threshold are deleted from the diversity set after being added into the diversity set since their CINRs do not reach the deletion threshold. After the deletion, they are added into the diversity set again since their CINRs are more than the addition threshold and then they are deleted again. This process is repeated, which leads to a large amount of interactivities of signaling messages and meaningless cost of system resources.

Therefore, only when the addition threshold is more than the deletion threshold, soft handover of the system will be performed in a stable, effective and optimized manner.

To prevent the threshold inversion, there are provided three methods in the embodiments of the present invention to adjust parameters in the above formulas (1) and (2).

To ensure that H_Add_d is always more than H_Delete_d, the algorithm of the linear function needs to be analyzed. As n is the total number of all base stations in the diversity set; m, for a certain base station in the diversity set, refers to the total number of remaining base stations with CINRs more than that of this base station in the diversity set. That is, n is always more than m, and therefore $$\sum_{i=1}^{n} CINR_i$$

is always more than $$\sum_{i=1}^{m} CINR_i.$$

The two kinds of thresholds are both linear functions of ΣCINR$_i$ and Slope is a slope parameter adopted by both algorithms. It can thus be educed that $$Slope \times \sum_{i=1}^{n} CINR_i$$

is always more than $$Slope \times \sum_{i=1}^{m} CINR_i.$$

Therefore, to ensure that H_Add_d is more than H_Delete_d, Add_Intercept only needs to be more than or equal to Delete_Intercept. For this purpose, when configuring parameters, the operators only need to ensure that Add_Intercept is more than or equal to Delete_Intercept to prevent the threshold inversion. Based on this idea, there are three methods to achieve it, i.e. Method 1 to Method 3.

Method 1

In this method, the parameters carried in the DCD comprise Slope, Add_Intercept and Delete_Intercept_Adjust.

When using Slope, Add_Intercept and Delete_Intercept to determine the dynamical addition threshold of the diversity set and the dynamical deletion threshold(s), it is required that $$Delete\_Intercept = Add\_Intercept - Delete\_Intercept\_Adjust \quad (3)$$

to ensure Delete_Intercept≦Add_Intercept to present the threshold inversion.

Method 2

In this method, the operators can make the DCD message carry three parameters Slope, Add_Intercept_Adjust and Delete_Intercept. It is required that $$\text{Add\_Intercept} = \text{Delete\_Intercept} + \text{Add\_Intercept\_Adjust} \quad (4)$$

and Delete_Intercept≦Add_Intercept can also be guaranteed.

FIG. 4A is a flow chart of determining soft handover diversity set thresholds by adopting the above Method 1. As shown in FIG. 4A, the process of determining soft handover diversity set thresholds by adopting the above Method 1 mainly comprises the following steps (Steps S402A to S410A):

Step S402A, a terminal acquires the parameters such as Slope, Add_Intercept, Delete_Intercept_Adjust and the like from a DCD message which is sent from the base station;

Step S404A, parameter Delete_Intercept is calculated according to Add_Intercept and Delete_Intercept_Adjust referring to formula (3) above;

Step S406A, H_Add_d and $$\sum_{i=1}^{m} CINR_i$$

of H_Delete_d for each base station are respectively calculated according to the CINRs of base stations in the diversity set.

Step S408A, H_Add_d and H_Delete_d are respectively calculated referring to formulas (1) and (2).

Step S410A, soft handover is performed according to the calculated H_Add_d and H_Delete_d.

FIG. 4B is a flow chart of determining soft handover diversity set thresholds by adopting the above Method 2. As shown in FIG. 4B, the process of determining soft handover diversity set thresholds by adopting the above Method 2 mainly comprises the following steps (Steps S402B to S410B):

Step S402B, a terminal acquires parameters such as Slope, Delete_Intercept, Add_Intercept_Adjust and the like from a DCD message which is sent from a base station;

Step S404B, parameter Add_Intercept is calculated according to Delete_Intercept and Add_Intercept_Adjust referring to formula (4) above;

Step S406B, H_Add_d and $$\sum_{i=1}^{m} CINR_i$$

of H_Delete_d of each base station are respectively calculated according to the base stations in the diversity set.

Step S408B, H_Add_d and H_Delete_d are respectively calculated referring to formulas (1) and (2).

Step S410B, soft handover is performed according to the calculated H_Add_d and H_Delete_d.

Method 3

In Method 3, the two intercept parameters are not restricted, but the final threshold values are restricted, that is, when H_Delete_d is more than H_Add_d−Margin, it is required that H_Delete_d=H_Add_d−Margin, wherein Margin is a margin parameter specified to introduce hysteresis effect, whose configuration and adjustment can be performed by the operators. After the margin parameter is introduced, it can be ensured that H_Add_d always exceeds H_Delete_d by a certain margin so as to avoid the base station whose CINR is on a critical value from being added into and deleted from the diversity set repeatedly.

In the above method, four parameters Slope, Margin, Add_Intercept and Delete_Intercept can be carried in the DCD message. After the dynamical addition threshold H_Add_d of the diversity set and the dynamical deletion threshold H_Delete_d of one base station in the diversity set are determined according to formulas (1) and (2), it is judged whether H_Delete_d is more than the difference between H_Add_d and Margin and when the judgment result is yes, it is required $$H\_Delete\_d = H\_Add\_d - \text{Margin} \quad (5)$$

FIG. 5 is a flow chart of soft handover by adopting Method 3. As shown in FIG. 5, the method mainly comprises the following steps (Steps S500 to S510).

Step S500, parameters such as Slope, Add_Intercept, Delete_Intercept and Margin are acquired from a DCD message which is sent from a base station;

Step S502, H_Add_d and $$\sum_{i=1}^{m} CINR_i$$

of H_Delete_d of each base station are respectively calculated according to the CINRs of the base stations in the diversity set.

Step S504, H_Add_d and H_Delete_d of each base station are respectively calculated according to formulas (1) and (2).

Step S506, it is respectively judged whether for each base station H_Delete_d≦H_Add_d−Margin. If yes, perform step S510, otherwise perform step S508.

Step S508, H_Delete_d=H_Add_d−Margin is set.

Step S510, soft handover is performed according to the calculated H_Add_d and H_Delete_d.

According to the method and terminal for determining soft handover diversity set thresholds provided by the embodiments of the present invention, the simulated embodiments with Matlab bring about the following results.

In the following embodiments, it is supposed that FBSS or MDHO soft handover is performed to a terminal when it moves from base station A to base station B; supposing the moving speed of the terminal is constant, and at the beginning the terminal is very close to base station A and at last very close to base station B. The whole handover process is evenly divided into 21 time points in terms of time. The CINRs of base stations A and B are sampled at each time point. For the convenience of analysis, suppose that the time cost of adding a base station to or deleting a base station from the diversity set by the terminal is equal to the interval between two adjacent time points.

Embodiment 1

In this embodiment, the method of avoiding threshold inversion is not adopted, and since Add_Intercept is less than Delete_Intercept, threshold inversion will occur. For example, suppose Slope is 0.875 dB, Add_Intercept is −7.5 dB, and Delete_Intercept is −6 dB. The sampling values of the CINRs of base stations A and B, calculated values of dynamical thresholds, and the set where base stations are located at different time points are listed in Table 1, and FIG. 6 shows the data in Table 1.

TABLE 1 values of CINRs and dynamical thresholds at different time points

| Time Point | CINRa (dB) | CINRb (dB) | H_Delete_d (dB) of base station A | H_Delete_d (dB) of base station B | H_Add_d (dB) | State of base station A | State of base station B |
|---|---|---|---|---|---|---|---|
| 1 | 40 | 17 | — | — | 27.5 | Diversity Set | Adjacent Area |
| 2 | 39.9 | 21 | — | — | 27.41 | Diversity Set | Adjacent Area |
| 3 | 39.7 | 24 | — | — | 27.24 | Diversity Set | Adjacent Area |
| 4 | 39.4 | 26 | — | — | 26.98 | Diversity Set | Adjacent Area |
| 5 | 39 | 28 | — | — | 26.63 | Diversity Set | Adjacent Area |
| 6 | 38.5 | 29 | — | 27.69 | 26.59 | Diversity Set | Diversity Set |
| 7 | 37.9 | 30 | — | 27.16 | 26.23 | Diversity Set | Diversity Set |
| 8 | 37.2 | 31 | — | 26.55 | 25.87 | Diversity Set | Diversity Set |
| 9 | 36.4 | 32.5 | — | 25.85 | 25.65 | Diversity Set | Diversity Set |
| 10 | 35.5 | 33.5 | — | 25.06 | 25.42 | Diversity Set | Diversity Set |
| 11 | 34.5 | 34.5 | — | — | 25.32 | Diversity Set | Diversity Set |
| 12 | 33.5 | 35.5 | 25.06 | — | 25.42 | Diversity Set | Diversity Set |
| 13 | 32.5 | 36.4 | 25.85 | — | 25.65 | Diversity Set | Diversity Set |
| 14 | 31 | 37.2 | 26.55 | — | 25.87 | Diversity Set | Diversity Set |
| 15 | 30 | 37.9 | 27.16 | — | 26.23 | Diversity Set | Diversity Set |
| 16 | 29 | 38.5 | 27.69 | — | 26.59 | Diversity Set | Diversity Set |
| 17 | 28 | 39 | 28.13 | — | 26.92 | Diversity Set | Diversity Set |
| 18 | 26 | 39.4 | — | — | 26.98 | Adjacent Area | Diversity Set |
| 19 | 24 | 39.7 | — | — | 27.24 | Adjacent Area | Diversity Set |
| 20 | 21 | 39.9 | — | — | 27.41 | Adjacent Area | Diversity Set |
| 21 | 17 | 40 | — | — | 27.5 | Adjacent Area | Diversity Set |

(Slope = 0.875 dB, Add_Intercept = −7.5 dB, Delete_Intercept = −6 dB)

It can be seen from FIG. 6 or Table 1 that dynamical thresholds is increased with the increase of $\Sigma CINR_i$ reduced with the reduction of $\Sigma CINR_i$. For one base station, H_Delete_d does not always exist, for (1) this base station is not in the diversity set or (2) the base station is in the diversity set but its CINR is the strongest in the diversity set.

It can also be seen from FIG. 6 or Table 1 that at time points from t13 to t17, H_Add_d is less than H_Delete_d of base station A; at time points from t6 to t9, H_Add_d is less than H_Delete_d of base station B and threshold inversion happens at these time points.

Embodiment 2

In this embodiment Methods 1 and 2 of preventing threshold inversion are adopted and it is required Add_Intercept=Delete_Intercept=−6 dB. The calculation result of dynamical thresholds is illustrated in Table 2, and FIG. 7 shows the data in Table 2.

TABLE 2 values of the CINRs and dynamical thresholds at different time points after Method 1 is adopted

| Time Point | CINRa (dB) | CINRb (dB) | H_Delete_d(dB) of base station A | H_Delete_d(dB) of base station B | H_Add_d(dB) | State of base station A | State of base station B |
|---|---|---|---|---|---|---|---|
| 1 | 40 | 17 | — | — | 27.5 | Diversity Set | Adjacent Area |
| 2 | 39.9 | 21 | — | — | 27.41 | Diversity Set | Adjacent Area |
| 3 | 39.7 | 24 | — | — | 27.24 | Diversity Set | Adjacent Area |

TABLE 2-continued values of the CINRs and dynamical thresholds at different time points after Method 1 is adopted

| Time Point | CINRa (dB) | CINRb (dB) | H_Delete_d(dB) of base station A | H_Delete_d(dB) of base station B | H_Add_d(dB) | State of base station A | State of base station B |
|---|---|---|---|---|---|---|---|
| 4 | 39.4 | 26 | — | — | 26.98 | Diversity Set | Adjacent Area |
| 5 | 39 | 28 | — | — | 26.63 | Diversity Set | Adjacent Area |
| 6 | 38.5 | 29 | — | 26.19 | 26.59 | Diversity Set | Diversity Set |
| 7 | 37.9 | 30 | — | 25.66 | 26.23 | Diversity Set | Diversity Set |
| 8 | 37.2 | 31 | — | 25.05 | 25.87 | Diversity Set | Diversity Set |
| 9 | 36.4 | 32.5 | — | 24.35 | 25.65 | Diversity Set | Diversity Set |
| 10 | 35.5 | 33.5 | — | 23.56 | 25.42 | Diversity Set | Diversity Set |
| 11 | 34.5 | 34.5 | — | — | 25.32 | Diversity Set | Diversity Set |
| 12 | 33.5 | 35.5 | 23.56 | — | 25.42 | Diversity Set | Diversity Set |
| 13 | 32.5 | 36.4 | 24.35 | — | 25.65 | Diversity Set | Diversity Set |
| 14 | 31 | 37.2 | 25.05 | — | 25.87 | Diversity Set | Diversity Set |
| 15 | 30 | 37.9 | 25.66 | — | 26.23 | Diversity Set | Diversity Set |
| 16 | 29 | 38.5 | 26.19 | — | 26.59 | Diversity Set | Diversity Set |
| 17 | 28 | 39 | 26.63 | — | 26.92 | Diversity Set | Diversity Set |
| 18 | 26 | 39.4 | 26.98 | — | 27.14 | Diversity Set | Diversity Set |
| 19 | 24 | 39.7 | — | — | 27.24 | Adjacent Area | Diversity Set |
| 20 | 21 | 39.9 | — | — | 27.41 | Adjacent Area | Diversity Set |
| 21 | 17 | 40 | — | — | 27.5 | Adjacent Area | Diversity Set |

(Slope = 0.875 dB, Add Intercept = Delete Intercept = −6 dB)

Embodiment 3

Operators can configure and adjust parameters according to actual needs. In this embodiment, the slope is reduced from 0.875 dB in Embodiment 1 to 0.25 dB, Add_Intercept and Delete_Intercept are increased from −6 dB to 17 dB, so as to reduce the influence of $\Sigma CINR_i$ on the final dynamical thresholds and increase the influence of intercepts on the final dynamical thresholds. The calculation results of dynamical thresholds are illustrated in Table 3, and FIG. 8 is a curve chart of the data in Table 3.

TABLE 3 values of the CINRs and dynamical thresholds at different time points after Method 1 or 2 is adopted

| Time Point | CINRa (dB) | CINRb (dB) | H Delete_d(dB) of base station A | H_Delete_d(dB) of base station B | H_Add_d(dB) | State of base station A | State of base station B |
|---|---|---|---|---|---|---|---|
| 1 | 40 | 17 | — | — | 27 | Diversity Set | Adjacent Area |
| 2 | 39.9 | 21 | — | — | 26.98 | Diversity Set | Adjacent Area |
| 3 | 39.7 | 24 | — | — | 26.93 | Diversity Set | Adjacent Area |
| 4 | 39.4 | 26 | — | — | 26.85 | Diversity Set | Adjacent Area |
| 5 | 39 | 28 | — | — | 26.75 | Diversity Set | Adjacent Area |
| 6 | 38.5 | 29 | — | 26.63 | 26.74 | Diversity Set | Diversity Set |
| 7 | 37.9 | 30 | — | 26.48 | 26.64 | Diversity Set | Diversity Set |

TABLE 3-continued values of the CINRs and dynamical thresholds at different time points after Method 1 or 2 is adopted

| Time Point | CINRa (dB) | CINRb (dB) | H_Delete_d(dB) of base station A | H_Delete_d(dB) of base station B | H_Add_d(dB) | State of base station A | State of base station B |
|---|---|---|---|---|---|---|---|
| 8 | 37.2 | 31 | — | 26.3 | 26.53 | Diversity Set | Diversity Set |
| 9 | 36.4 | 32.5 | — | 26.1 | 26.47 | Diversity Set | Diversity Set |
| 10 | 35.5 | 33.5 | — | 25.88 | 26.41 | Diversity Set | Diversity Set |
| 11 | 34.5 | 34.5 | — | — | 26.38 | Diversity Set | Diversity Set |
| 12 | 33.5 | 35.5 | 25.88 | — | 26.41 | Diversity Set | Diversity Set |
| 13 | 32.5 | 36.4 | 26.1 | — | 26.47 | Diversity Set | Diversity Set |
| 14 | 31 | 37.2 | 26.3 | — | 26.53 | Diversity Set | Diversity Set |
| 15 | 30 | 37.9 | 26.48 | — | 26.64 | Diversity Set | Diversity Set |
| 16 | 29 | 38.5 | 26.63 | — | 26.74 | Diversity Set | Diversity Set |
| 17 | 28 | 39 | 26.75 | — | 26.83 | Diversity Set | Diversity Set |
| 18 | 26 | 39.4 | 26.85 | — | 26.9 | Diversity Set | Diversity Set |
| 19 | 24 | 39.7 | — | — | 26.93 | Adjacent Area | Diversity Set |
| 20 | 21 | 39.9 | — | — | 26.98 | Adjacent Area | Diversity Set |
| 21 | 17 | 40 | — | — | 27 | Adjacent Area | Diversity Set |

(Slope = 0.25 dB, Add_Intercept = Delete_Intercept = 7 dB)

Embodiment 4

This embodiment adopts Method 3 to prevent threshold inversion, that is, H_Delete_d=H_Add_d−Margin is required. When Margin is supposed to be 1 dB, the calculation results of dynamical thresholds are as illustrated in Table 4, and FIG. 9 shows the data in Table 4.

TABLE 4 values of the CINRs and dynamical thresholds at different time points after Method 3 is adopted

| Time Point | CINRa (dB) | CINRb (dB) | H_Delete_d(dB) of base station A | H_Delete_d(dB) of base station B | H_Add_d(dB) | State of base station A | State of base station B |
|---|---|---|---|---|---|---|---|
| 1 | 40 | 17 | — | — | 27.5 | Diversity Set | Adjacent Area |
| 2 | 39.9 | 21 | — | — | 27.41 | Diversity Set | Adjacent Area |
| 3 | 39.7 | 24 | — | — | 27.24 | Diversity Set | Adjacent Area |
| 4 | 39.4 | 26 | — | — | 26.98 | Diversity Set | Adjacent Area |
| 5 | 39 | 28 | — | — | 26.63 | Diversity Set | Adjacent Area |
| 6 | 38.5 | 29 | — | 25.59 | 26.59 | Diversity Set | Diversity Set |
| 7 | 37.9 | 30 | — | 25.23 | 26.23 | Diversity Set | Diversity Set |
| 8 | 37.2 | 31 | — | 24.87 | 25.87 | Diversity Set | Diversity Set |
| 9 | 36.4 | 32.5 | — | 24.65 | 25.65 | Diversity Set | Diversity Set |
| 10 | 35.5 | 33.5 | — | 24.42 | 25.42 | Diversity Set | Diversity Set |
| 11 | 34.5 | 34.5 | — | — | 25.32 | Diversity Set | Diversity Set |

TABLE 4-continued values of the CINRs and dynamical thresholds at different time points after Method 3 is adopted

| Time Point | CINRa (dB) | CINRb (dB) | H_Delete_d(dB) of base station A | H_Delete_d(dB) of base station B | H_Add_d(dB) | State of base station A | State of base station B |
| --- | --- | --- | --- | --- | --- | --- | --- |
| 12 | 33.5 | 35.5 | 24.42 | — | 25.42 | Diversity Set | Diversity Set |
| 13 | 32.5 | 36.4 | 24.65 | — | 25.65 | Diversity Set | Diversity Set |
| 14 | 31 | 37.2 | 24.87 | — | 25.87 | Diversity Set | Diversity Set |
| 15 | 30 | 37.9 | 25.23 | — | 26.23 | Diversity Set | Diversity Set |
| 16 | 29 | 38.5 | 25.59 | — | 26.59 | Diversity Set | Diversity Set |
| 17 | 28 | 39 | 25.92 | — | 26.92 | Diversity Set | Diversity Set |
| 18 | 26 | 39.4 | 26.14 | — | 27.14 | Diversity Set | Diversity Set |
| 19 | 24 | 39.7 | — | — | 27.24 | Adjacent Area | Diversity Set |
| 20 | 21 | 39.9 | — | — | 27.41 | Adjacent Area | Diversity Set |
| 21 | 17 | 40 | — | — | 27.5 | Adjacent Area | Diversity Set |

(Slope = 0.875 dB, Add_Intercept = −7.5 dB, Delete_Intercept = −6 dB, Margin = 1 dB)

As stated above, by means of the technical solutions provided in the embodiments of the present invention, the problems that handover diversity set thresholds are lack of flexibility and handover thresholds can not be optimized flexibly according to practical network conditions are solved. With the technical solutions provided in the embodiments of the present invention, a terminal can adjust diversity set thresholds dynamically according to actual coverage conditions of network, and threshold inversion can be effectively avoided, so as to ensure a stable, effective and optimized soft handover of the system.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the program code executable to the calculating device. Consequently, they can be stored in the storing device and executed by the calculating device, or they are made into integrated circuit modules respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the present invention.

What is claimed is:

1. A method for determining soft handover diversity set thresholds, comprising:

a terminal determining a dynamical addition threshold of a diversity set corresponding to the terminal according to a first predetermined information, wherein the first predetermined information comprises Carrier-to-Interference-and-Noise Ratios (CINRs) of all base stations in the diversity set and parameters carried in a downlink channel descriptor message received by the terminal from base stations; and the terminal respectively determining a dynamical deletion threshold of each base station in the diversity set according to a second predetermined information, wherein in respect of each base station, the second predetermined information comprises CINRs of base stations in the diversity set with CINRs more than the CINR of the base station and parameters carried in the downlink channel descriptor message, wherein the terminal determines the dynamical addition threshold H_Add_d of the diversity set according to the first predetermined information via the following formula:

$$H\_Add\_d = Slope \times \sum_{i=1}^{n} CINR_i + Add\_Intercept,$$

wherein Slope is a preset weighted parameter more than zero, Add_Intercept is a preset static addition threshold determined according to the parameters carried in the downlink channel descriptor message, and $$\sum_{i=1}^{n} CINR_i$$

is a sum of the CINRs of all base stations in the diversity set, and wherein the terminal respectively determines the dynamical deletion threshold H_Delete_d of each base station in the diversity set according to the second predetermined information via the following formula:

$$H\_Delete\_d = Slope \times \sum_{i=1}^{m} CINR_i + Delete\_Intercept,$$

wherein Slope is a preset weighted parameter more than zero, Delete_Intercept is a preset static deletion threshold determined according to parameters carried in the downlink channel descriptor message, and $$\sum_{i=1}^{m} CINR_i$$

is a sum of the CINRs of base stations in the diversity set with CINRs more than the CINR of the base station.

2. The method according to claim 1, wherein the parameters carried in the downlink channel descriptor message comprise the weighted parameter, the static addition threshold and an adjusted value of the static deletion threshold; wherein the static deletion threshold is a difference between the static addition threshold and the adjusted value of the static deletion threshold.

3. The method according to claim 1, wherein the parameters carried in the downlink channel descriptor message comprise the weighted parameter, the static deletion threshold and an adjusted value of the static addition threshold; wherein the static addition threshold is a sum of the static deletion threshold and the adjusted value of the static addition threshold.

4. The method according to claim 1, wherein the parameters carried in the downlink channel descriptor message comprise the weighted parameter, the static deletion threshold, the static addition threshold and a margin parameter; when the dynamical deletion threshold of one of the base stations in the diversity set is more than the difference between the dynamical addition threshold of the diversity set and the margin parameter, the dynamical deletion threshold is set to be the difference between the dynamical addition threshold and the margin parameter.

5. A terminal, comprising:
a receiving module, configured to receive a downlink channel descriptor message from a base station;
a measuring module, configured to measure a CINR of each base station in a diversity set corresponding to the terminal;
a first determining module, configured to determine a dynamical addition threshold of the diversity set according to parameters carried in the downlink channel descriptor message received by the receiving module and CINRs of all base stations in the diversity set measured by the measuring module; and
a second determining module, configured to respectively determine a dynamical deletion threshold of each base station in the diversity set, wherein the dynamical deletion threshold of each base station is determined according to CINRs of base stations in the diversity set with CINRs more than the CINR of the base station and parameters carried in the downlink channel descriptor message,
wherein the first determining module comprises a first determining sub-module, configured to determine the dynamical addition threshold H_Add_d of the diversity set according to the weighted parameter and static addition threshold acquired by the first acquiring sub-module and the CINR of each base station in the diversity set measured by the measuring module via the following formula:

$$H\_Add\_d = Slope \times \sum_{i=1}^{n} CINR_i + Add\_Intercept,$$

wherein Slope is the weighted parameter, Add_Intercept is the static addition threshold, and $$\sum_{i=1}^{n} CINR_i$$

is a sum of the CINRs of all base stations in the diversity set, and
wherein the second determining module comprises a second determining sub-module, configured to respectively determine the dynamical deletion threshold H_Delete_d of each base station of the diversity set according to the weighted parameter and static deletion threshold acquired by the second acquiring sub-module and the CINR of each base station of the diversity set measured by the measuring module via the following formula:

$$H\_Delete\_d = Slope \times \sum_{i=1}^{m} CINR_i + Delete\_Intercept,$$

wherein Slope is the weighted parameter, Delete_Intercept is the static deletion threshold, and $$\sum_{i=1}^{m} CINR_i$$

is the sum of CINRs of base stations in the diversity set with CINRs more than the CINR of the base station.

6. The terminal according to claim 5, wherein the first determining module comprises:
a first acquiring sub-module, configured to acquire a preset weighted parameter and a static addition threshold from the downlink channel descriptor message.

7. The terminal according to claim 6, wherein the first acquiring sub-module further comprises:
a reading unit, configured to read the weighted parameter, the static deletion threshold and an adjusted value of the static addition threshold from parameters carried in the downlink channel descriptor message;
a determining unit, configured to set the sum of the static deletion threshold and the adjusted value of the static addition threshold read by the reading unit as the static addition threshold.

8. The terminal according to claim 5, wherein the second determining module comprises:
a second acquiring sub-module, configured to acquire a preset weighted parameter and a static deletion threshold of the diversity set from the downlink channel descriptor message.

9. The terminal according to claim 8, wherein the second acquiring sub-module comprises:

a reading unit, configured to read the weighted parameter, the static addition threshold and an adjusted value of the static deletion threshold from parameters carried in the downlink channel descriptor message;

a determining unit, configured to set the difference between the static addition threshold and the adjusted value of the static deletion threshold read by the reading unit as the static deletion threshold.

10. The terminal according to claim 9, wherein the second determining module further comprises:

a third acquiring sub-module, configured to acquire a preset margin parameter from the downlink channel descriptor message;

a judging sub-module, configured to judge whether the dynamical deletion threshold of each base station is more than the difference between the dynamical addition threshold and the margin parameter;

a setting sub-module, configured to set the difference between the dynamical addition threshold and the margin parameter as the dynamical deletion threshold of the base station in the condition that the judgment result of the judging sub-module is yes.

* * * * *